United States Patent
Fukuda et al.

(10) Patent No.: US 10,691,924 B2
(45) Date of Patent: Jun. 23, 2020

(54) BIOLOGICAL INFORMATION DETECTION DEVICE AND BIOLOGICAL INFORMATION DETECTION METHOD

(71) Applicant: HITACHI, LTD., Tokyo (JP)

(72) Inventors: Nobuhiro Fukuda, Tokyo (JP); Akira Date, Tokyo (JP); Hidenori Sakaniwa, Tokyo (JP); Takashi Kanemaru, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 104 days.

(21) Appl. No.: 15/826,200

(22) Filed: Nov. 29, 2017

(65) Prior Publication Data

US 2018/0150682 A1 May 31, 2018

(30) Foreign Application Priority Data

Nov. 29, 2016 (JP) ................. 2016-231007

(51) Int. Cl.
*G06K 9/00* (2006.01)
*G06K 9/62* (2006.01)
*G06K 9/46* (2006.01)

(52) U.S. Cl.
CPC ..... *G06K 9/00255* (2013.01); *G06K 9/00268* (2013.01); *G06K 9/4652* (2013.01); *G06K 9/6202* (2013.01)

(58) Field of Classification Search
None
See application file for complete search history.

(56) References Cited

U.S. PATENT DOCUMENTS

| 2016/0343135 A1 | 11/2016 | De Haan et al. |
| 2017/0112382 A1 | 4/2017 | Nakata et al. |
| 2018/0042486 A1* | 2/2018 | Yoshizawa ......... A61B 5/02416 |
| 2018/0068171 A1* | 3/2018 | Jones ................. A61B 5/00 |

FOREIGN PATENT DOCUMENTS

| JP | 2012-239661 A | 12/2012 |
| WO | 2016/006027 A1 | 1/2016 |
| WO | 2016/159150 A1 | 10/2016 |

OTHER PUBLICATIONS

Japanese Office Action dated Feb. 18, 2020 for the Japanese Patent Application No. 2016-231007.

* cited by examiner

*Primary Examiner* — Vikkram Bali
(74) *Attorney, Agent, or Firm* — Volpe and Koenig, P.C.

(57) ABSTRACT

A pulse detection method resistant to changes in an imaging environment is provided.
A biological information detection device includes an imaging unit that images reflected light from a target object and outputs a video signal including a plurality of wavelength components, a reflected light analysis unit that obtains a wavelength and an intensity of the reflected light from the video signal, a wavelength fluctuation detection unit that detects difference between the wavelength of the reflected light of each time and the wavelength of the reflected light of a time before each of the time, and a pulse detecting unit that detects a change in accordance with a time of the detected difference as a pulse.

7 Claims, 6 Drawing Sheets

BIOLOGICAL INFORMATION DETECTION DEVICE AND BIOLOGICAL INFORMATION DETECTION METHOD

CLAIM OF PRIORITY

The present application claims priority from Japanese patent application JP 2016-231007 filed on Nov. 29, 2016, the content of which is hereby incorporated by reference into this application.

TECHNICAL FIELD

The present invention relates to a device for detecting biological information.

BACKGROUND ART

As a method of obtaining biological information, there is a technology that can detect the biological information in real time in a non-contact manner using the microwave or a camera. Particularly, recently, pulse detection using the cameras is spreading by being mounted on a portable terminal in which miniaturization of a camera module is progressed including a smartphone.

As a technology of performing the pulse detection by imaging, there is a method of specifying a pulse signal from spectrum distribution of a time series signal (PTL 1).

CITATION LIST

Patent Literature

PTL 1: JP-A-2012-239661

SUMMARY OF INVENTION

Technical Problem

For example, since a face video is reflected light when the illumination light is irradiated on a face, a change of a spectral intensity of reflected light of three colors is observed in the method using an RGB signal in the related art. Therefore, in a case where steady light falls on the face, it is possible to stably detect a pulse. However, in a case where a change of external light occurs in the imaging environment, each spectrum is affected and erroneous detection occurs. In addition, by applying independent component analysis, it is possible to separate noise, but it is difficult to specify physical quantity after conversion.

In view of the above-described problems, the present invention focuses on a fact that the amount of change in each signal component of an RGB signal is different and a color component of a face video is separated into a wavelength of the reflected light and the spectral intensity. Accordingly, an object of the invention is to provide a detection method resistant to environmental changes.

Solution to Problem

To solve the problems, according to the present invention, there is provided a biological information detection device including an imaging unit that images reflected light from a target object and outputs a video signal including a plurality of wavelength components, a reflected light analysis unit that obtains a wavelength and an intensity of the reflected light from the video signal, a wavelength fluctuation detection unit that detects difference between the wavelength of the reflected light of each time and the wavelength of the reflected light of a time before each of the time, and a pulse detecting unit that detects a change in accordance with a time of the detected difference as a pulse.

Advantageous Effects of Invention

According to one aspect of the present invention, by suppressing the influence of external light in a face video, it is possible to provide a pulse detection method resistant to changes in an imaging environment. The problems, configurations, and effects other than the above are clarified by the description of the embodiments below.

DESCRIPTION OF EMBODIMENTS

Hereinafter, embodiments of the present invention will be described with reference to the drawings, but the present invention is not necessarily limited to these embodiments. In the drawings illustrating the embodiments, the same members are denoted by the same reference numerals, and repeated explanation thereof is omitted.

Example 1

In this example, an example of a biological information detection device of performing pulse detection including a camera and by extracting a wavelength and a spectrum from a face video will be described.

Figure 1:
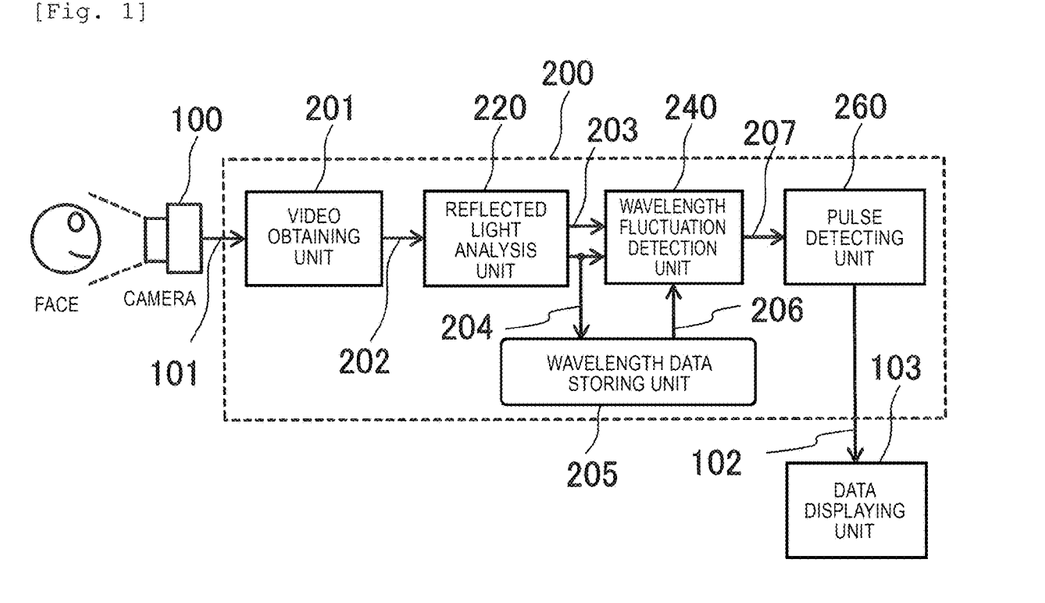
FIG. 1 is a block diagram for explaining an example of a configuration of a biological information detection device in Example 1 of the present invention.

FIG. 1 is a block diagram for explaining an example of a configuration of the biological information detection device in Example 1 of the present invention.

In the example, the biological information detection device includes a camera 100, a video processing unit 200, and a data displaying unit 103.

The video processing unit 200 includes a video obtaining unit 201, a reflected light analysis unit 220, a wavelength data storing unit 205, a wavelength fluctuation detection unit 240, and a pulse detecting unit 260. The video obtaining unit 201 receives an imaging data signal 101 obtained from the camera 100, and outputs a video RGB signal 202. The reflected light analysis unit 220 receives the RGB signal 202 as an input signal, and outputs a level signal 203 and a wavelength data signal 204. The wavelength data storing unit 205 stores the wavelength data signal 204, and outputs a delay wavelength data signal 206. The wavelength fluctuation detection unit 240 receives the level signal 203 and the wavelength data signal 204, obtains the difference between frames of the wavelength, and outputs a wavelength difference data signal 207. The pulse detecting unit 260 receives the wavelength difference data signal 207, and outputs a pulse signal 102.

For example, the video processing unit 200 of the embodiment may be a calculator connected to the camera 100. In this case, the video processing unit 200 includes a processor (not shown), a storage device (not shown), and an input and output device (not shown), and a program stored in the storage device is executed such that functions of the video obtaining unit 201, the reflected light analysis unit 220, the wavelength fluctuation detection unit 240, and the pulse detecting unit 260 are realized. The wavelength data storing unit 205, a video data storage unit 221 (see FIG. 2), a difference data storage unit 261, a smoothing data storage unit 265, a code data storage unit 269, an area data storage unit 250, and an accumulated data storage unit 256 are realized by the storage device. In addition, for example, the input and output device includes an input device (not shown) such as a keyboard and a mouse and the data displaying unit 103 that displays an image or the like.

Figure 2:
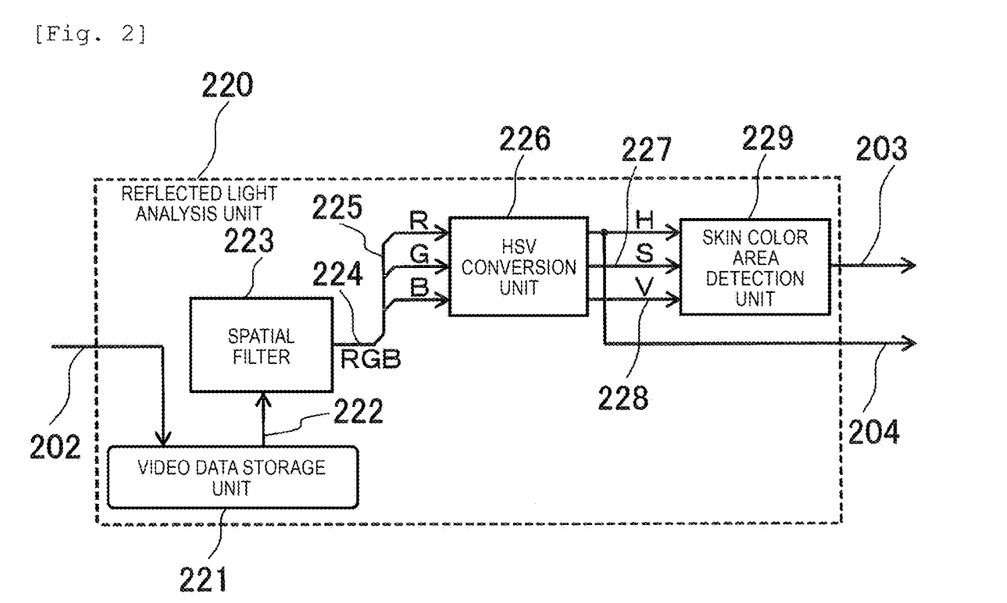
FIG. 2 is a block diagram for explaining an example of a reflected light analysis unit of the biological information detection device in Example 1 of the present invention.

FIG. 2 is a block diagram for explaining an example of the reflected light analysis unit 220 of the biological information detection device in Example 1 of the present invention.

The reflected light analysis unit 220 includes the video data storage unit 221, a spatial filter 223, an HSV conversion unit 226, and a skin color area detection unit 229, and performs a video process for each pixel. The video data storage unit 221 receives the RGB signal 202, and outputs a delay RGB signal 222 having a line delay corresponding to a tap of a convolution kernel. The spatial filter 223 receives the delay RGB signal 222, performs the weighted average on, for example, the pixel of interest and surrounding pixels, and outputs a smoothed RGB signal 224. An HSV conversion unit 226 receives an unpack signal 225 in which the smoothed RGB signal 224 is decomposed into R (red), G (green), and B (blue) signals, and converts the received unpack signal into an H signal (hue), that is, the wavelength data signal 204, an S signal (chroma) 227, and a V signal (lightness) 228. The skin color area detection unit 229 receives the H signal (hue) 204, the S signal (chroma) 227, and the V signal (lightness) 228, and outputs the level signal 203 indicating a skin color area that is an area on a color space including the color of human skin.

Figure 8:
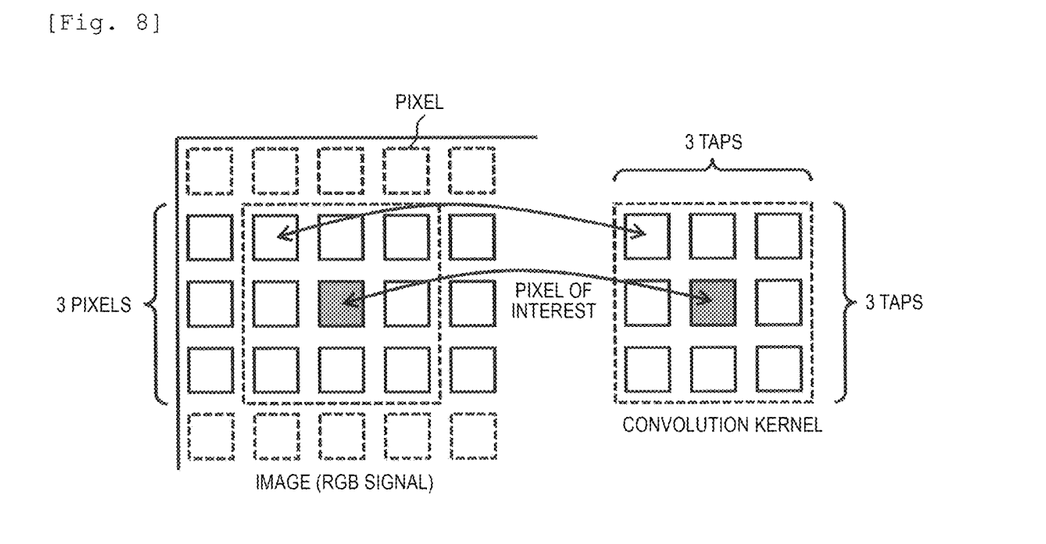
FIG. 8 is a diagram illustrating an example of a spatial filter in Example 1 of the present invention.

FIG. 8 is a diagram illustrating an example of the spatial filter in Example 1 of the present invention.

FIG. 8 is an example in which three vertically and horizontally taps, that is, a convolution kernel of 3×3 are applied to an image. A value obtained by performing convolution calculation with a kernel with respect to the pixel of interest of an image as the center becomes the smoothed RGB signal 224. A value of the kernel is a coefficient of the weighted average. The total value thereof may be 1.0, and, for example, average value distribution, Gaussian distribution, or the like can be used in the smoothing.

Figure 9:
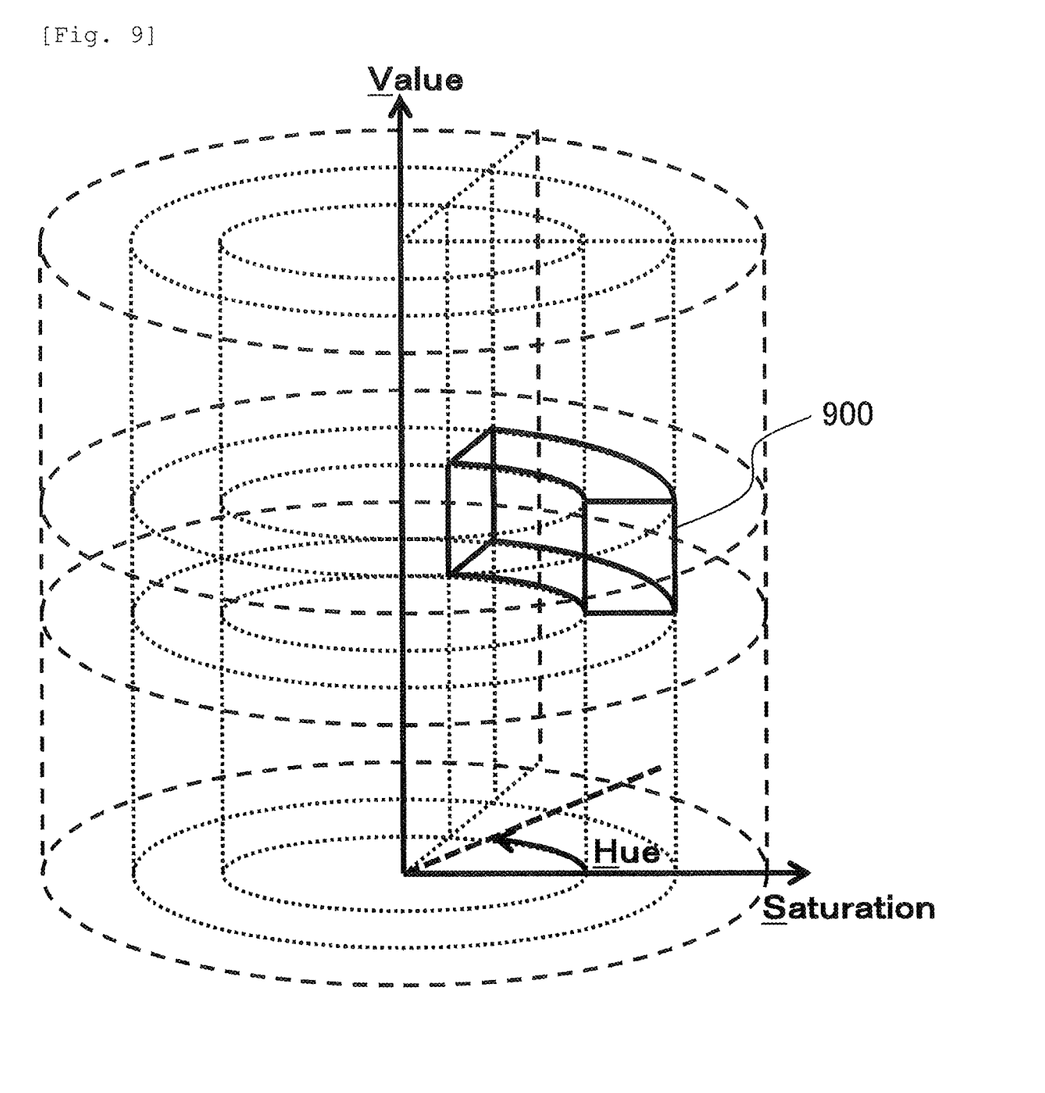
FIG. 9 is a diagram illustrating an example of a specified range of an HSV color space and a partial color space in Example 1 of the present invention.

FIG. 9 is a diagram illustrating an example of a designated range of an HSV color space and a partial color space in Example 1 of the present invention.

FIG. 9 represents the HSV color space by cylindrical coordinates. The vertical axis represents the brightness of color with Value, that is, lightness, and the axis in a radial direction represents a color intensity with Saturation, that is, chroma. A rotation angle is Hue, that is, the hue. The hue is independent of an intensity and darkness, and when it is considered that imaging captures the reflection of light, the hue is considered to correspond to a wavelength component of reflected light. Similarly, the lightness can be considered to indicate the intensity of a specific wavelength. The skin color area detection unit 229 designates a skin color area by using the partial color space as an area 900 of FIG. 9 in the HSV color space, the skin color area detection unit 229 may output 1 as the level signal 203 in a case where the HSV value is included, and the skin color area detection unit 229 may output 0 in a case where the HSV value is not included in the skin color area.

Figure 10:
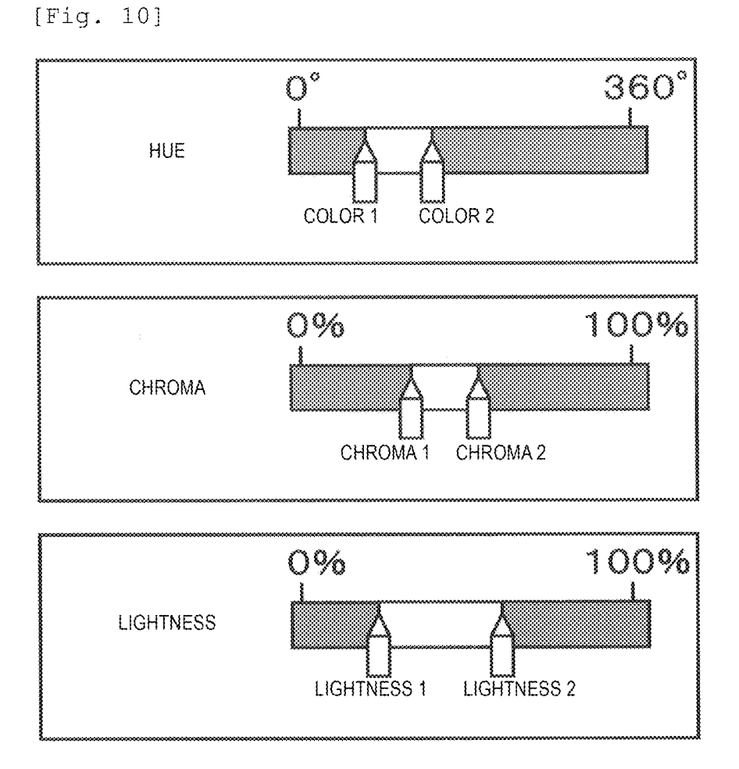
FIG. 10 is a diagram for explaining an example of a setting method of the partial color space in Example 1 of the present invention.

FIG. 10 is a diagram for explaining an example of a setting method of the partial color space in Example 1 of the present invention.

For example, as described in FIG. 10, the data displaying unit 103 of the biological information detection device displays bars indicating the entire range of each of the hue, the chroma, and the lightness, and icons indicating both ends (for example, "color 1" and "color 2" designating hue) of a range designated on these bars. A user may designate a range by operating these icons by using an input device (not shown) of the video processing unit 200.

For example, a bar of a range from 0° to 360° is illustrated for the hue, 0°=360° is red, 120° is green, and 240° is blue. As illustrated in FIG. 10, a section (that is, range of hue from color 1 to color 2) designated by the color 1 and the color 2 may be the range. Similarly, as the chroma is 0% as light color and 100% as dark color, and the lightness is 0% as dark color and 100% as light color, by designating both ends (for example, chroma 1 and chroma 2 for chroma, and lightness 1 and lightness 2 for lightness) of the range, the range may be designated. For example, there is a case where the skin color, the brightness, or the like to be imaged is greatly different by a type of an illumination used at the time of imaging a person with the camera 100, individual difference in skin color for each person to be imaged, or the like. However, by appropriately setting the range of the hue, the chroma, and the lightness by using such a setting method, it is possible to appropriately detect the pulse according to imaging environment and properties (for example, skin color) of the person to be imaged.

Figure 3:
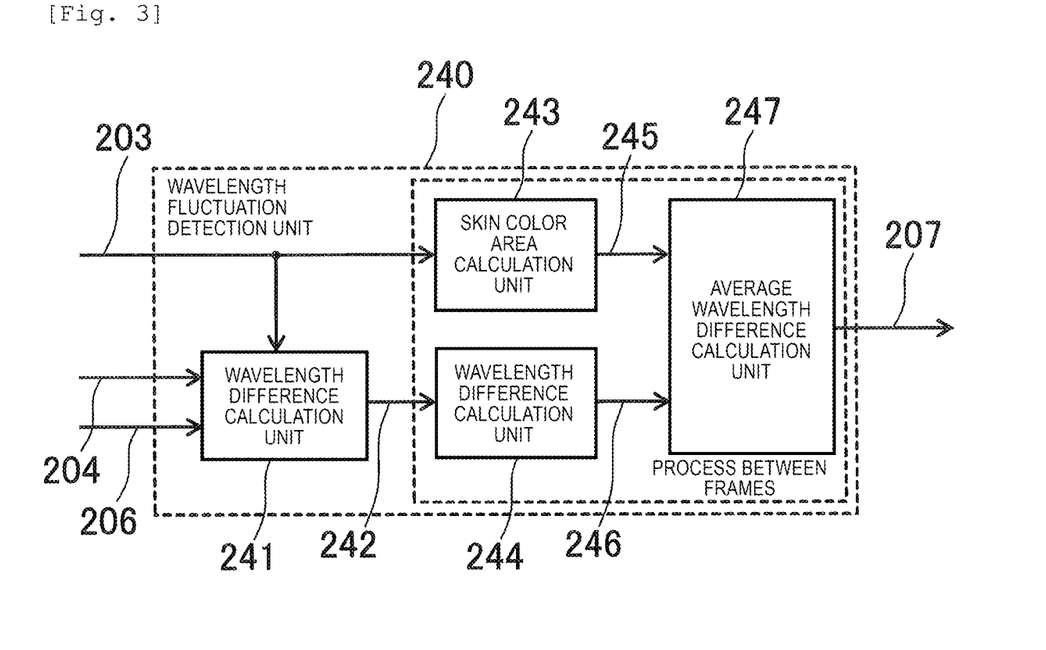
FIG. 3 is a block diagram for explaining an example of a wavelength fluctuation detection unit of the biological information detection device in Example 1 of the present invention.

FIG. 3 is a block diagram for explaining an example of the wavelength fluctuation detection unit of the biological information detection device in the Example 1 of the present invention.

The wavelength fluctuation detection unit 240 includes a wavelength difference calculation unit 241, a skin area calculation unit 243, a wavelength difference calculation unit 244, and an average wavelength difference calculation unit 247. The wavelength difference calculation unit 241 receives the level signal 203 indicating the skin color area, the wavelength data signal 204, and the delay wavelength data signal 206, outputs a wavelength difference data signal 242 (that is, which is difference between wavelength data signal 204 at each time and the wavelength data signal 204 at time before each time) calculated from the wavelength data signal 204 and the delay wavelength data signal 206 which are input in a case where a pixel signal is input into the skin color area (that is, in case where 1 is input as level signal 203), and outputs a 0 value in a case where a pixel signal other than the skin color area is input. The skin area calculation unit 243 receives the level signal 203 indicating the skin color area, counts the number of pixels of the skin color area for each frame, and outputs a skin color area signal 245. The wavelength difference calculation unit 244 receives the wavelength difference data signal 242 of a skin color area pixel, accumulates wavelength difference for each frame, and outputs an accumulated wavelength difference data signal 246. The average wavelength difference calculation unit 247 receives the skin color area signal 245 and the accumulated wavelength difference data signal 246, and outputs the wavelength difference data signal 207 averaged (that is, with respect to entire pixels in one frame) between frames by dividing accumulated wavelength difference data by the skin color area.

Figure 4:
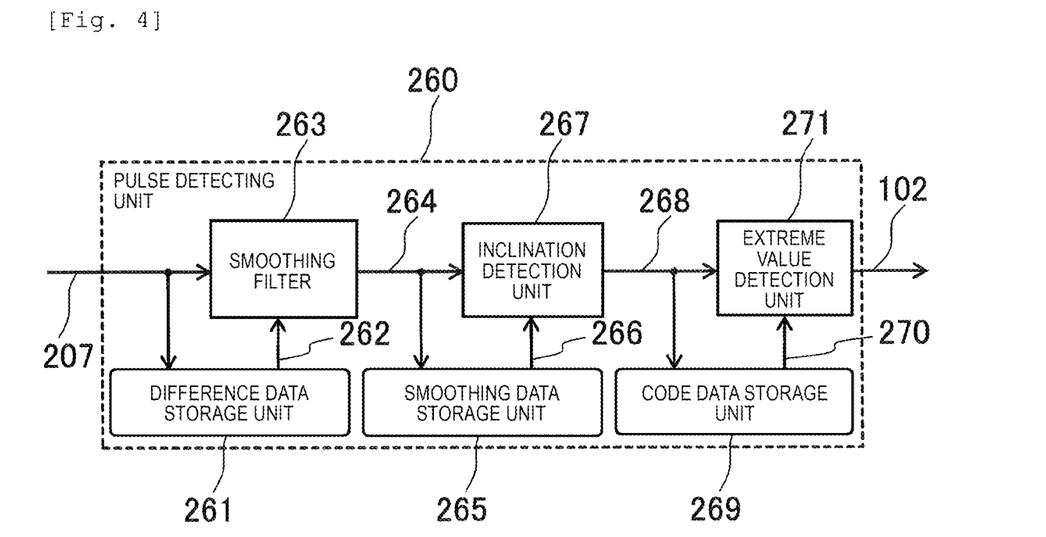
FIG. 4 is a block diagram for explaining an example of a pulse detecting unit of the biological information detection device in Example 1 of the present invention.

FIG. 4 is a block diagram for explaining an example of the pulse detecting unit of the biological information detection device in the Example 1 of the present invention.

The pulse detecting unit 260 includes the difference data storage unit 261, a smoothing filter 263, the smoothing data storage unit 265, an inclination detection unit 267, the code data storage unit 269, and an extreme value detection unit 271, and performs a video process for each frame. The difference data storage unit 261 receives the wavelength difference data signal 207, and outputs a delay wavelength difference data signal 262. The smoothing filter 263 receives the wavelength difference data signal 207 and the delay wavelength difference data signal 262, and outputs a smoothed wavelength difference data signal 264 smoothed by wavelength data corresponding to a plurality of frames on a continuous time axis. The smoothing data storage unit 265 receives the smoothed wavelength difference data signal 264, holds wavelength difference data corresponding to the plurality of frames, and outputs a smoothed delay wavelength difference data signal 266.

The inclination detection unit 267 compares the smoothed wavelength difference data signal 264 at a certain time with a signal (that is, smoothed wavelength difference data signal 264 at earlier time) output from the smoothing data storage unit 265 such that a change (that is, inclination) of the smoothed wavelength difference data is detected and a sign data signal 268 for obtaining a sign of the inclination is output. Specifically, the inclination detection unit 267 may compare smoothed wavelength difference data signals of two consecutive frames, and may compare the smoothed wavelength difference data signals between average frames of several consecutive neighboring frames. In the latter case, for example, the inclination detection unit 267 may calculate the inclination of the difference by comparing the average of the wavelength difference data of a plurality of consecutive frames with the average of the wavelength difference data of a plurality of consecutive frames before the frames. The code data storage unit 269 receives the sign data signal 268, holds sign data corresponding to the plurality of frames, and outputs a delay sign data signal 270.

The extreme value detection unit 271 receives the sign data signal 268 and the delay sign data signal 270, the extreme value is obtained by setting a frame (that is, change of difference in accordance with time is changed from increase to decrease) in which the sign of the inclination is changed from a positive value to a negative value as the maximum and a frame (change of difference in accordance with time is changed from decrease to increase) in which the sign is changed from the negative value to the positive value as the minimum, and, for example, the maximum value (or minimum value) is output as the pulse signal 102. Alternatively, the extreme value detection unit 271 may output information indicating a timing at which the maximum value (or minimum value) is detected.

As described above, the smoothing filter 263 smooths a difference data signal such that erroneous detection of the pulse due to minute variation of the difference data signal by noise or the like is prevented. The inclination detection unit 267 detects change (inclination) of difference data between adjacent frames, and the extreme value detection unit 271 detects the maximum value or the minimum value of the difference data based on a result thereof such that the pulse signal with good accuracy can be generated. In a case where the inclination detection unit 267 obtains the difference between average frames of the consecutive neighboring a plurality of frames, the erroneous detection of the pulse is prevented similar to the smoothing.

Here, in the data displaying unit 103, as the maximum value of the pulse signal is regarded as an R wave of heart beat, maximum value intervals, that is, R wave intervals corresponding to the plurality of frames are calculated, and when frequency analysis is performed, peaks of high frequency component (HF) and low frequency component (LF) are seen. Generally, the LF and the HF are called as a stress index and can also be used for detecting a stress state.

According to the above configuration, by separating color components of the face video into the wavelength and the spectral components of the reflected light, it is possible to provide a detection method resistant to environmental change.

In the above Example 1, the camera 100 is a color camera of visible light, and generates a video signal including three wavelength components of R, G, and B. However, this is an example, and the camera 100 maybe any type as long as an imaging device for outputting the video signal including a plurality of wavelength components by imaging the reflected light from a target object (for example, face of human). For example, at least one of the plurality of wavelengths may be included in an infrared or ultraviolet area. In addition, a plurality of the cameras 100 may be used to generate the video signal.

In addition, the camera 100 may output the video signal including two wavelength components. For example, in a case where only an R signal and a G signal are included in the video signal output by the camera 100, a color space to be generated is only an area in which the hue (Hue) is within a range of from R to G in the HSV color space illustrated in FIG. 9. However, if the skin color area 900 is included in the area, it is possible to perform the same process as the above.

In addition, in the above example, the RGB signal is converted into a signal of the HSV color space. However, as long as the color space including the hue and the brightness, the RGB signal may be converted into a signal of another color space such as an HSL (Hue, Saturation, and Lightness) color space. In either case, by detecting the wavelength fluctuation based on the signal of the hue, it is possible to provide a detection method resistant to the environmental change. For example, in a case of the HSL color space, the luminance is obtained as the brightness, that is, the intensity.

Example 2

In Example 1, a configuration of the biological information detection device in which the skin color area is detected and the pulse detection as the face video is performed. In Example 2, a biological information detection device having a configuration in which face detection is further performed and a skin color area is detected after specifying the head in the biological information detection device of the same as the Example 1 according to the present invention, will be described. Except for the differences described below, since each part of the biological information detection device of Example 2 has the same function as each part denoted by the same reference numeral in Example 1 illustrated in FIG. 1 to FIG. 4 or the like, explanation thereof will be omitted.

A configuration of the biological information detection device of Example 2 is the same as that of the biological information detection device of Example 1 illustrated in FIG. 1, other than the reflected light analysis unit 220.

Figure 5:
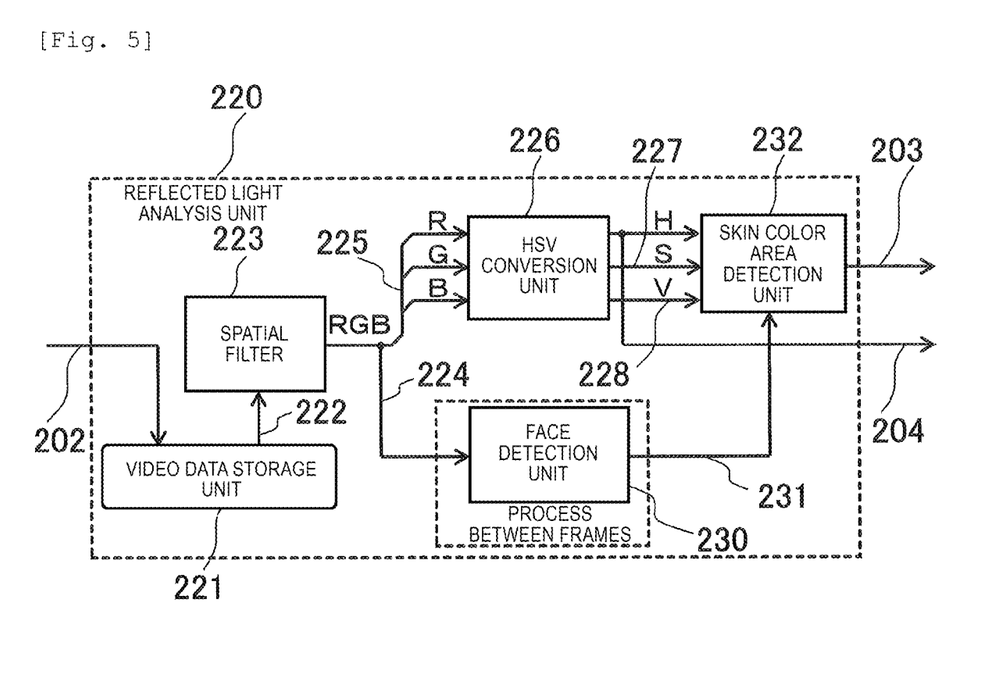
FIG. 5 is a block diagram for explaining an example of a reflected light analysis unit of a biological information detection device in Example 2 of the present invention.

FIG. 5 is a block diagram for explaining an example of a reflected light analysis unit 220 of a biological information detection device in Example 2 of the present invention.

The reflected light analysis unit 220 in Example 2 includes the video data storage unit 221, the spatial filter 223, the HSV conversion unit 226, a face detection unit 230, and a skin color area detection unit 232. Among these, the face detection unit 230 performs the video process for each frame, and other portion thereof performs the video process for each pixel. In addition, the video data storage unit 221, the spatial filter 223, and the HSV conversion unit 226 are the same as those of Example 1, and a part of the process of the skin color area detection unit 232 is different from that of Example 1.

The video data storage unit 221 receives the RGB signal 202, and outputs the delay RGB signal 222 having line delay corresponding to the tap of the convolution kernel. The spatial filter 223 receives the delay RGB signal 222, performs the weighted average with respect to, for example, the pixel of interest and the pixels therearound, and outputs the smoothed RGB signal 224. The HSV conversion unit 226 receives the unpack signal 225 obtained by decomposing the smoothed RGB signal 224 into R, G, and B signals, and converts the received unpack signal 225 into the H signal (hue), that is, the wavelength data signal 204, the S signal (chroma) 227, and the V signal (lightness) 228. The face detection unit 230 receives the smoothed RGB signal 224, performs the face detection by, for example, the Viola-Jones method, and outputs a face area signal 231. The skin color area detection unit 232 receives the H signal (hue) 204, the S signal (chroma) 227, the V signal (lightness) 228, and the face area signal 231, and outputs the level signal 203 indicating the skin color area in the face area signal illustrated in FIG. 11.

Figure 11:
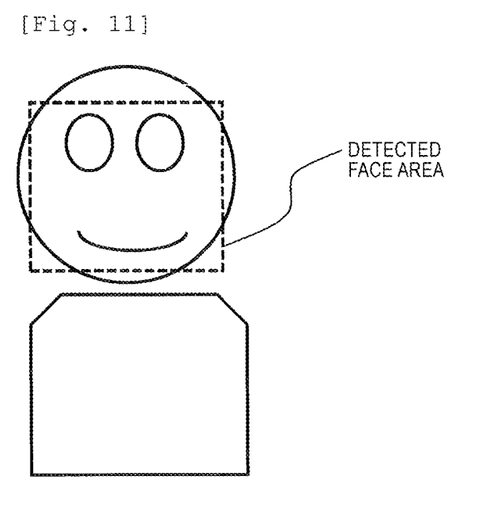
FIG. 11 is a diagram for explaining an example of a face area detected by a face detection unit of the biological information detection device in Example 2 of the present invention.

FIG. 11 is a diagram for explaining an example of the face area detected by the face detection unit 230 of the biological information detection device in Example 2 of the present invention.

In an example of FIG. 11, an area of a dotted line frame is detected from an image of the upper body including the face of a person as the face area.

According to the above configuration, it is possible to specify the face, suppress the erroneous detection due to the background of skin color or the like, and perform the pulse detection.

Example 3

In the Examples 1 and 2, the biological information detection device in which the skin color area is specified by the skin color area detection and the pulse detection based on the wavelength difference data in the skin color area is performed is described. In Example 3, in Example 1 according to the present invention, a configuration which suppresses the erroneous detection due to the influence of external light will be described. Except for the differences described below, since each part of the biological information detection device of Example 3 has the same function as each part denoted by the same reference numeral in Example 1 illustrated in FIG. 1 to FIG. 4 or the like, explanation thereof will be omitted.

A configuration of the biological information detection device of Example 3 other than the reflected light analysis unit 220, the wavelength fluctuation detection unit 240, and the level signal 203 connecting them is the same as the configuration of the biological information detection device of Example 1 illustrated in FIG. 1 or the like.

Figure 6:
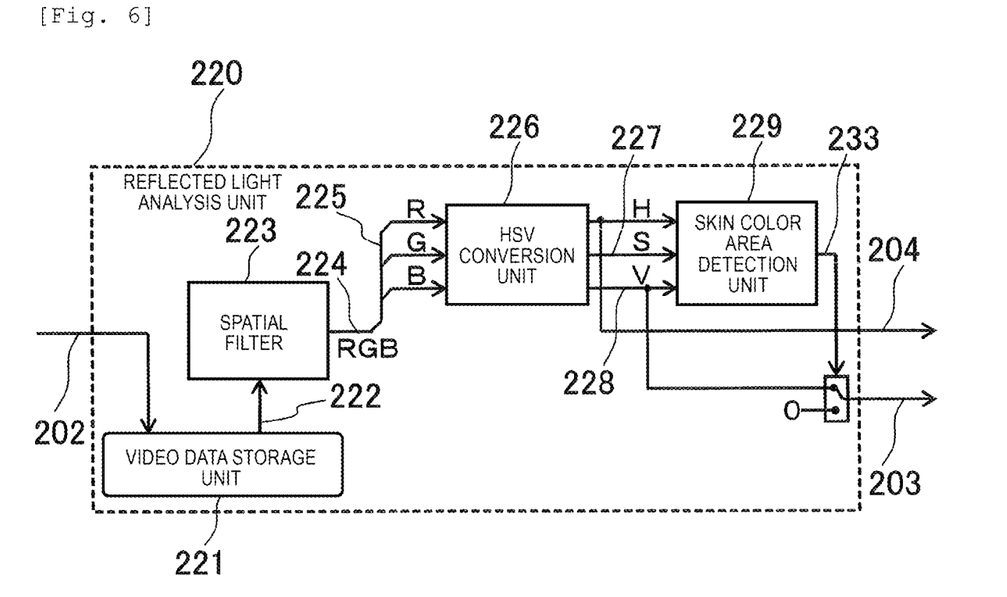
FIG. 6 is a block diagram for explaining an example of a reflected light analysis unit of a biological information detection device in Example 3 of the present invention.

FIG. 6 is a block diagram for explaining an example of the reflected light analysis unit 220 of a biological information detection device in Example 3 of the present invention.

The reflected light analysis unit 220 includes the video data storage unit 221, the spatial filter 223, the HSV conversion unit 226, and the skin color area detection unit 229, and performs the video process for each pixel. The video data storage unit 221 receives the RGB signal 202, and outputs the delay RGB signal 222 holding the line delay corresponding to the tap of the convolution kernel. The spatial filter 223 receives the delay RGB signal 222, and performs the weighted average with respect to, for example, the pixel of interest and the pixels therearound, and outputs the smoothed RGB signal 224. The HSV conversion unit 226 receives the unpack signal 225 obtained by decomposing the smoothed RGB signal 224 into R, G, and B signals, and converts the received unpack signal 225 into the H signal (hue), that is, the wavelength data signal 204, the S signal (chroma) 227, and the V signal (lightness) 228. The skin color area detection unit 229 receives the H signal (hue) 204, the S signal (chroma) 227, and the V signal (lightness) 228, and outputs a binary level signal 233 (mask signal) indicating the skin color area. The reflected light analysis unit 220 outputs the level signal 203 by switching the lightness signal 228 according to the binary level signal 233. That is, a value of the level signal 203 of Example 3 is set as 0 for a pixel other than the skin color area, and as a value of the lightness of a pixel for the pixel in the skin color area.

Figure 7:
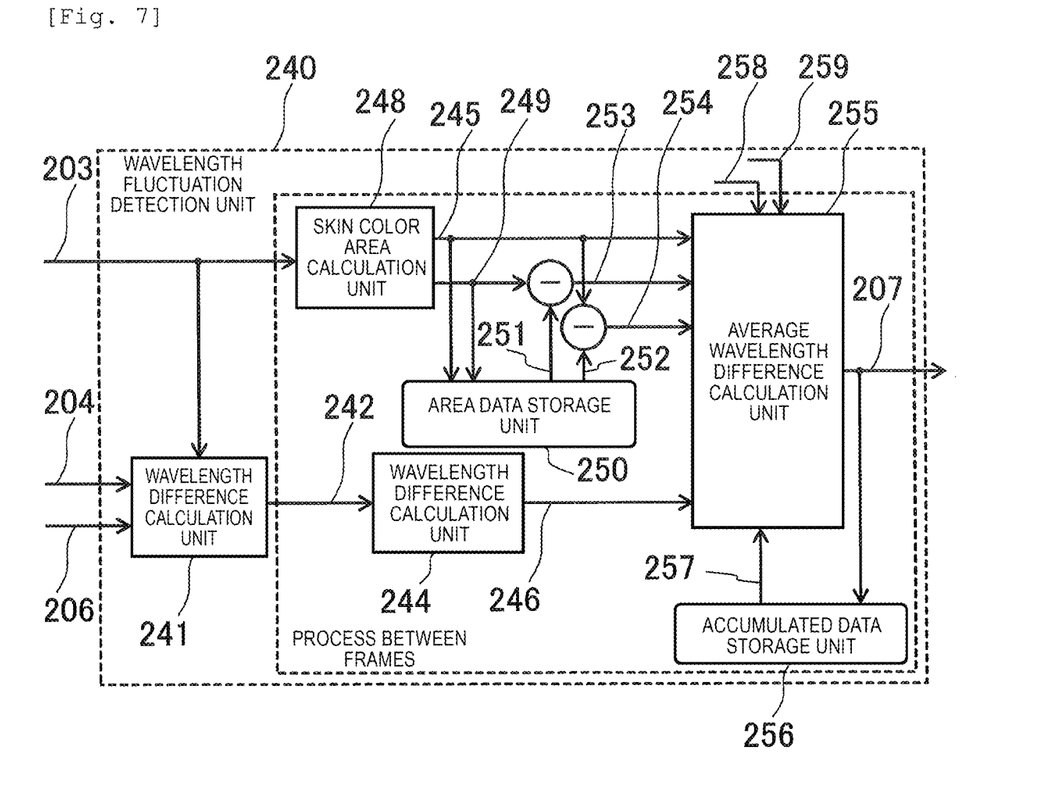
FIG. 7 is a block diagram for explaining an example of a wavelength fluctuation detection unit of the biological information detection device in Example 3 of the present invention.

FIG. 7 is a block diagram for explaining an example of the wavelength fluctuation detection unit 240 of the biological information detection device in Example 3 of the present invention.

The wavelength fluctuation detection unit 240 includes the wavelength difference calculation unit 241, a skin area calculation unit 248, the area data storage unit 250, the wavelength difference calculation unit 244, the accumulated data storage unit 256, and an average wavelength difference calculation unit 255. The wavelength difference calculation unit 241 receives the level signal 203 indicating the skin color area, the wavelength data signal 204, and the delay wavelength data signal 206, outputs the wavelength difference data signal 242 calculated from the wavelength data signal 204 and the delay wavelength data signal 206 which are received in a case where (that is, in case where 1 is received as level signal 203) a signal of a pixel in the skin color area is received, and outputs the 0 value in a case where signals of the pixels other than the skin color area are received. The skin area calculation unit 248 receives a signal 203 including a lightness level indicating the skin color area, counts the skin color area, that is, the number of pixels other than the 0 value for each frame, and outputs the skin color area signal 245 indicating an area of the skin color area and a lightness level signal 249 indicating the brightness of the skin color area. The area data storage unit 250 receives the skin color area signal 245 and the lightness level signal 249, and outputs a delay skin color area signal 252 and a delay lightness level signal 251. The wavelength difference calculation unit 244 receives the wavelength difference data signal 242 of the skin color area pixel, accumulates the wavelength difference for each frame, and outputs the accumulated wavelength difference data signal 246. The accumulated data storage unit 256 receives the wavelength difference data signal 207, holds data between the plurality of frames, and outputs a delay accumulation wavelength data signal 257. The average wavelength difference calculation unit 255 receives the skin color area signal 245, a lightness level difference signal 253 between the frames, a skin color area difference signal 254 between the frames, and the accumulated wavelength difference data signal 246, and the delay accumulation wavelength data signal 257, and outputs the wavelength difference data signal 207 averaged in the frame by dividing the accumulated wavelength difference data by the skin color area.

The lightness level difference signal 253 between the frames is the difference between the lightness level signal 249 of each frame and the lightness level signal 249 of a frame before (for example, immediately before) each frame stored in the area data storage unit 250. As the difference is great, the change in the lightness level is great. The skin color area difference signal 254 between the frames is difference between the skin color area signal 245 of each frame and the skin color area signal 245 of the frame before (for example, immediately before) each frame stored in the area data storage unit 250. As the difference is great, the change in the skin color area is great.

The average wavelength difference calculation unit 255 may output the delay accumulation wavelength data signal 257 (for example, the accumulated wavelength difference data signal 246 of past frame before one frame or the like, and wavelength difference data signal 207 output and calculated from skin color area signal 245) as the wavelength difference data signal 207 relating to the current frame, instead of the accumulated wavelength difference data signal 246 of the current frame and average wavelength difference data calculated from the skin color area signal 245, in a case where a sudden change in external light occurs, that is, in a case where the lightness level difference signal 253 is greater than a lightness level difference threshold 258, and may output an average value of the average wavelength difference data calculated from the delay accumulation wavelength data signal 257 and the accumulated wavelength difference data signal 246 and the skin color area signal 245 of the current frame as the wavelength difference data signal 207 relating to the current frame. As a result, the erroneous detection due to the sudden variation in the external light is suppressed. Similarly, the average wavelength difference calculation unit 255 may output the delay accumulation wavelength data signal 257 or an average value of the delay accumulation wavelength data signal 257, and from the average wavelength difference data calculated the accumulated wavelength difference data signal 246 and the skin color area signal 245 of the current frame as the wavelength difference data signal 207 relating to the current frame, instead of the average wavelength difference data of the current frame, even in a case where the change of the skin color area to be detected is great, that is, in a case where the skin color area difference signal 254 is greater than a skin color area difference threshold 259.

According to the above configuration, it is possible to suppress erroneous detection due to the sudden variation of the external light and the sudden variation of the imaged skin color area in the pulse detection, and suitably perform measurement.

The present invention is not limited to the embodiments described above, but includes various modifications. For example, the above-described embodiments have been described in detail for a better understanding of the present invention, and are not necessarily limited to those having all the configurations of the description. In addition, it is possible to replace a part of the configuration of one embodiment with the configuration of another embodiment. In addition, it is possible to add the configuration of another embodiment to the configuration of one embodiment. In addition, it is possible to add, delete, or replace other configurations with respect to part of the configuration of each embodiment.

In addition, some or all of the above-described configurations, functions, processing units, processing means, and the like may be realized by hardware, for example, by designing as an integrated circuit or the like. In addition, the above-described configurations, functions, and the like may be realized by software by interpreting and executing a program that the processor realizes each function. Information such as a program, a table, and a file that realize each function is stored in a storage device such as a non-volatile semiconductor memory, a hard disk drive, a solid state drive (SSD), or the like, or can be stored in a computer readable non-transitory data storage medium such as an IC card, an SD card, and a DVD.

In addition, control lines and information lines indicate what is considered to be necessary for explanation, and not necessarily all control lines and information lines are necessarily shown on the product. In fact, it may be considered that almost all the structures are mutually connected.

REFERENCE SIGNS LIST 101 imaging data signal
102 the pulse signal
200 video processing unit
202 RGB signal
203 level signal
204 wavelength data signal (hue signal)
206 delay wavelength data signal
207 wavelength difference data signal
222 delay RGB signal
224 smoothed RGB signal
225 unpack signal
227 chroma signal
228 lightness signal
231 face area signal
233 binary level signal (mask signal)
242 wavelength difference data signal of skin color area pixel
245 skin color area signal
246 accumulated wavelength difference data signal
249 lightness level signal
251 delay lightness level signal
252 delay skin color area signal
253 lightness level difference signal 254 skin color area difference signal
257 delay accumulation wavelength data signal
262 delay wavelength difference data signal
264 smoothed wavelength difference data signal
266 smoothed delay wavelength difference data signal
268 sign data signal
270 delay sign data signal
900 partial color space

The invention claimed is:

1. A biological information detection device comprising:
a camera that images reflected light from a person and outputs a video signal comprised of a plurality of video frames;
a memory; and
a processor that is communicatively coupled the camera and the memory, wherein the processor is configured to:
receive a first video frame of the video signal from the camera,
separate the first frame into Red, Green and Blue (RGB) signals by applying a spatial filter,
convert the RGB signals into a Hue signal (H), a Saturation signal (S), and Value signal (V),
determine a number of pixels in the first video frame that contain a skin color based on the Hue signal, the Saturation signal, and the Value signal, wherein a respective pixel contains the skin color when the respective pixel has respective Hue, Saturation, and Value parameters within a predetermined range stored in the memory,
calculates a magnitude of a difference between the hue signal and a prior hue signal stored in the memory, wherein the prior hue signal was derived from a prior video frame of the video signal,
calculate a wavelength difference value by dividing the magnitude of the difference by the number of pixels in the first video frame that contain the skin color, and
detects a pulse of the person by comparing the wavelength difference calculated with a prior wavelength difference stored in the memory, wherein the prior wavelength difference was calculated based on the prior video frame.

2. The biological information detection device according to claim 1,
wherein the processor is further configured to:
detect a face area of the person, and
determine the number of pixels in the first video frame that contain the skin color only in the face area of the person detected.

3. The biological information detection device according to claim 1, wherein the processor is further configured to:
store the hue signal in the memory as the prior hue signal for processing a subsequent video frame of the video signal, and
store the wavelength difference in the memory as the prior wavelength difference for processing the subsequent video frame of the video signal.

4. The biological information detection device according to claim 1, wherein the processor is further configured to:
detect a change of area of pixels that contain the skin color by comparing the number of pixels in the first video frame that contain the skin color calculated with a number of pixels in the prior video frame that contain the skin color stored in the memory.

5. The biological information detection device according to claim 1, wherein the processor is further configured to:
apply a smoothing filter to the wavelength difference to obtain a smoothed difference, and
detect the pulse of the person based on the smoothed difference.

6. The biological information detection device according to claim 5,
wherein the processor is further configured to detect the pulse of the person in accordance with a time when the smoothed difference changes from increase to decrease, or a minimum value at which a change of the difference is changed from the decrease to the increase.

7. A biological information detection method that measures a pulse of a person, the method comprising:
receiving, by a processor, a first video frame of a video signal from a camera, wherein the camera captures reflected light from the person and outputs the video signal comprised of a plurality of video frames including the first video frame to the processor;
separating, by the processor, the first frame into Red, Green and Blue (RGB) signals by applying a spatial filter;
converting, by the processor, the RGB signals into a Hue signal (H), a Saturation signal (S), and Value signal (V),
determining, by the processor, a number of pixels in the first video frame that contain a skin color based on the Hue signal, the Saturation signal, and the Value signal, wherein a respective pixel contains the skin color when the respective pixel has respective Hue, Saturation, and Value parameters within a predetermined range stored in a memory;
calculating, by the processor, a magnitude of a difference between the hue signal and a prior hue signal stored in the memory, wherein the prior hue signal was derived from a prior video frame of the video signal;
calculating, by the processor, a wavelength difference value by dividing the magnitude of the difference by the number of pixels in the first video frame that contain the skin color; and
measuring, by the processor, the pulse of the person by comparing the wavelength difference calculated with a prior wavelength difference stored in the memory, wherein the prior wavelength difference was calculated based on the prior video frame.

* * * * *